(12) United States Patent
Lee et al.

(10) Patent No.: US 9,695,075 B2
(45) Date of Patent: Jul. 4, 2017

(54) FLUIDIZED BED REACTOR FOR AMMONIA LADEN WASTEWATER AND METHOD FOR TREATING AMMONIA LADEN WASTEWATER

(71) Applicants: LEADERMAN & ASSOCIATES CO., LTD., Taipei (TW); NATIONAL CHIAO TUNG UNIVERSITY, Hsinchu (TW)

(72) Inventors: Der-Ming Lee, Taipei (TW); Ming-Kuei Chiang, Taipei (TW); Chin-Te Chen, Taipei (TW); Keng-Chuan Sung, Taipei (TW); Chien-Ju Lan, Taipei (TW); Jih-Gaw Lin, Hsinchu (TW); Yi-An Chiang, Taipei (TW)

(73) Assignees: LEADERMAN & ASSOCIATES CO., LTD., Taipei (TW); NATIONAL CHIAO TUNG UNIVERSITY, Hsinchu (TW)

( * ) Notice: Subject to any disclaimer, the term of this patent is extended or adjusted under 35 U.S.C. 154(b) by 3 days.

(21) Appl. No.: 14/667,150

(22) Filed: Mar. 24, 2015

(65) Prior Publication Data
US 2016/0207810 A1    Jul. 21, 2016

(30) Foreign Application Priority Data
Jan. 15, 2015 (TW) .............................. 104101327 A

(51) Int. Cl.
*C02F 3/28* (2006.01)
*C02F 3/30* (2006.01)
(Continued)

(52) U.S. Cl.
CPC ............. *C02F 3/2833* (2013.01); *C02F 3/307* (2013.01); *C02F 9/00* (2013.01); *C02F 3/2806* (2013.01);
(Continued)

(58) Field of Classification Search
CPC ...... C02F 3/307; C02F 2101/16; C02F 3/085; C02F 3/302; C02F 3/34
(Continued)

(56) References Cited

U.S. PATENT DOCUMENTS

| 5,582,733 A   * | 12/1996 | Desbos ................... C02F 3/085 210/151 |
| 2008/0245730 A1 * | 10/2008 | Tokutomi ................ C02F 3/006 210/605 |

(Continued)

OTHER PUBLICATIONS

Achlesh Daverey, Nien-Tzu Hung, Kasturi Dutta, Jih-Gaw Lin, Chen. 2013. Ambient temperature SNAD process treating anaerobic digester liquor of swine wastewater. Bioresource Technology 141:191-198.

(Continued)

*Primary Examiner* — Fred Prince
(74) *Attorney, Agent, or Firm* — Muncy, Geissler, Olds & Lowe, P.C.

(57) ABSTRACT

A fluidized bed reactor for ammonia laden wastewater includes a column, a plurality of carrier particles, a first settling tank and a fluidizing means. The column defines a fluidizing chamber therein, and the fluidizing means is adapted for introducing the ammonia laden wastewater into the fluidizing chamber and further into the first settling tank. The reactor is further provided with microorganisms including nitrifying bacteria, anammox bacteria and heterotrophic denitrifying bacteria attached to the carrier particles. Nitrification reaction, anammox reaction and heterotrophic denitrification reaction are simultaneously taking place in the
(Continued)

fluidizing chamber to transform ammonia into nitrogen by the microorganisms. A method for treating ammonia laden wastewater is also provided. The fluidized bed reactor is advantageous in the fact that its start-up is significantly shortened and it is adapted to efficiently treat thin ammonia laden wastewater.

10 Claims, 4 Drawing Sheets

(51) Int. Cl.
*C02F 9/00* (2006.01)
*C02F 3/00* (2006.01)
(52) U.S. Cl.
CPC ............ *C02F 3/286* (2013.01); *C02F 3/2853* (2013.01); *C02F 3/301* (2013.01); *C02F 3/305* (2013.01); *C02F 2003/001* (2013.01); *Y02E 50/343* (2013.01); *Y02W 10/37* (2015.05)

(58) Field of Classification Search
USPC ....... 210/605, 615, 616, 617, 630, 150, 151, 210/903
See application file for complete search history.

(56) References Cited

U.S. PATENT DOCUMENTS

| 2011/0284461 A1* | 11/2011 | DiMassimo | ............ C02F 3/006 210/616 |
| 2013/0056411 A1* | 3/2013 | Lee | .......... C02F 3/101 210/605 |
| 2015/0076060 A1 | 3/2015 | Lee | |

OTHER PUBLICATIONS

Radhika Keluskar, Anuradha Nerurkar, Anjana Desai. 2013. Development of a simultaneous partial nitrification, anaerobic ammonia oxidation and denitrification (SNAD) bench scale process for removal of ammonia from effluent of a fertilizer industry. Bioresource Technology 130:390-397.

* cited by examiner

FLUIDIZED BED REACTOR FOR AMMONIA LADEN WASTEWATER AND METHOD FOR TREATING AMMONIA LADEN WASTEWATER

BACKGROUND OF THE INVENTION

1. Field of the Invention

The present invention relates generally to a wastewater treatment device and a treatment method of wastewater, and more particularly to a fluidized bed reactor and a method applying the same.

2. Description of the Related Art

The traditional nitrification-denitrification is one of the most widespread biotechnology for nitrogen removal in wastewater treatment plants. However, this biological process has been challenged by anaerobic ammonia oxidation (Anammox) process due to its more energy saving. In anammox reaction, ammonia and nitrite act as electron donor and accepter, respectively, to yield nitrogen gas and nitrate.

It is recognized that anammox process is used to treat wastewaters with high nitrogen concentration (more than 500 mg N/L) at mesophilic temperature. The main reason is due to the slow growth of anammox bacteria. Once the infeed ammonia nitrogen concentration is low, the start-up of the bioreactor can be significantly increased. Even worth, if the infeed ammonia nitrogen is too low, the bio-system based on anammox bacteria might not be built successfully. Since municipal wastewater has low nitrogen concentration, normally ranging from 20-85 mg N/L, there is a saying that anammox process cannot treat municipal wastewater efficiently.

SUMMARY OF THE INVENTION

It is therefore one objective of the present invention to provide anammox-based method and device that are capable of treating thin ammonia laden wastewater.

In order to achieve the above-mentioned and other objectives, a fluidized bed reactor for ammonia laden wastewater is provided, in which the fluidized bed reactor includes a column, a plurality of carrier particles, a first settling tank and a fluidizing means. The column defines a fluidizing chamber therein, and the column has an upper opening and a lower opening, both of which are in communication with the fluidizing chamber. The carrier particles are partially filled in the fluidizing chamber. The first settling tank has a bottom opening and a first outlet located at a position higher than the bottom opening. The bottom opening is in communication with the upper opening of the column. The fluidizing means is adapted for introducing the ammonia laden wastewater into the fluidizing chamber via the lower opening, and for further fluidizing the carrier particles within the fluidizing chamber. The ammonia laden wastewater so introduced further has COD. The fluidized bed reactor is further provided with microorganisms, which includes nitrifying bacteria, anammox bacteria and heterotrophic denitrifying bacteria. At least a part of the microorganisms are attached to the carrier particles. The nitrifying bacteria is adapted to perform nitrification reaction and transform ammonia into nitrite. The anammox bacteria is adapted to perform anammox reaction and transform ammonia and nitrite into nitrogen gas and nitrate. The heterotrophic denitrifying bacteria is adapted to perform heterotrophic denitrification reaction and transform nitrate and COD into nitrogen gas.

In order to achieve the above-mentioned and other objectives, a method for treating ammonia laden wastewater is also provided, in which the method applies the above-mentioned fluidized bed reactor. The nitrification reaction, the anammox reaction and the heterotrophic denitrification reaction are simultaneously taking place within the fluidizing chamber. The ammonia laden wastewater is introduced into the fluidizing chamber via the lower opening and then flows through, in sequence, the upper opening, the bottom opening and the first outlet.

The fluidized bed reactor and the treatment method of the present invention are advantageous in the fact that the start-up time can be significantly shortened compared with other reactors/methods, and that the reactor and the method of the present invention can be used to treat thin ammonia laden wastewater efficiently.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given herein below and the accompanying drawings which are given by way of illustration only, and thus are not limitative of the present invention, and wherein.

DETAILED DESCRIPTION OF THE INVENTION

Figure 1:
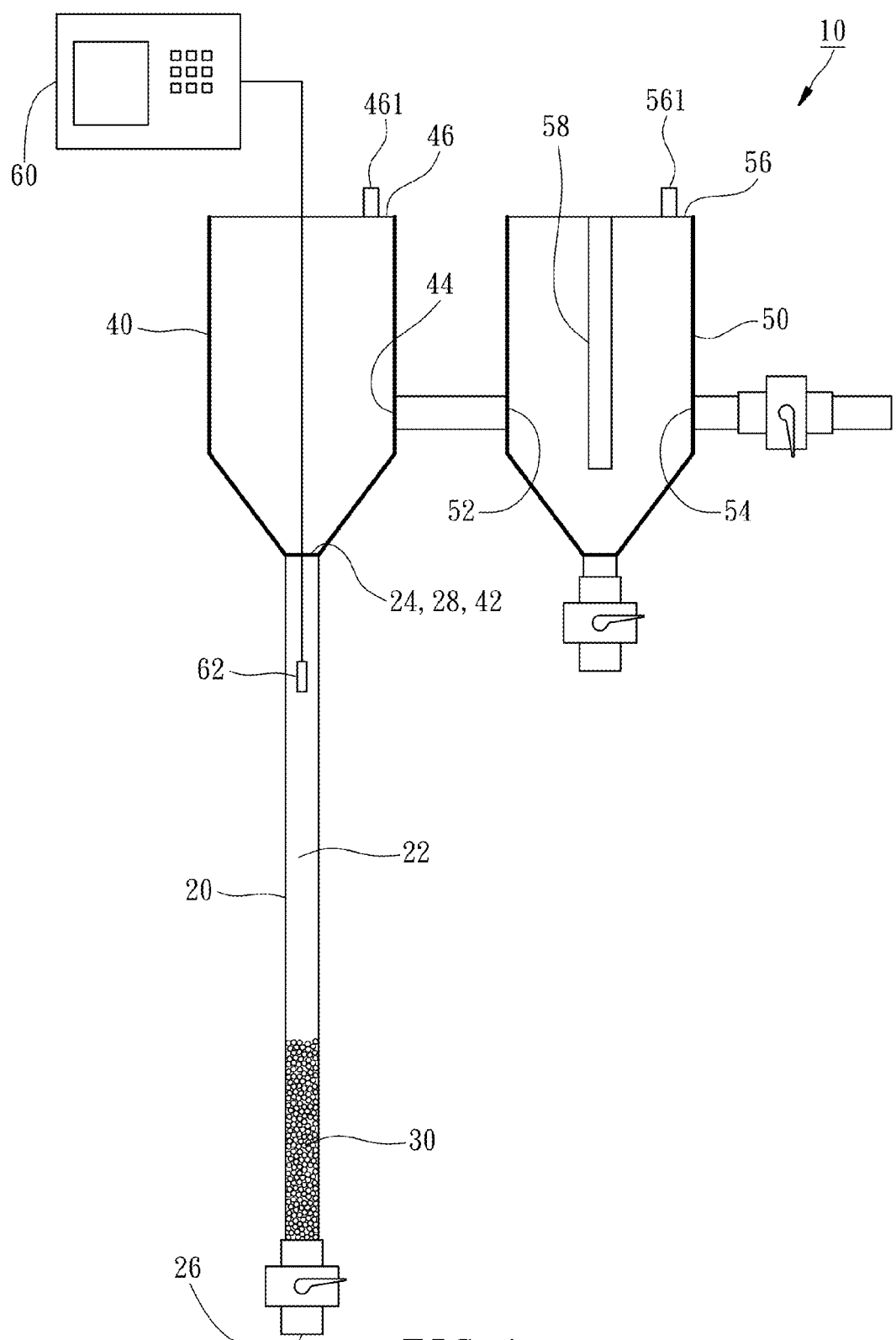
FIG. 1 is a drawing showing a fluidized bed reactor in accordance with an embodiment of the present invention before activated.

Please refer to FIG. 1 for an embodiment of the present invention showing a fluidized bed reactor 10, which has a total working volume of 11 liters. The fluidized bed reactor 10 has a column 20, a plurality of carrier particles 30, a first settling tank 40, a second settling tank 50 and an aeration apparatus 60.

The column 20 defines a fluidizing chamber 22 having a volume of 2 liters. The column 20 has an upper opening 24, a lower opening 26 and a top end 28. The upper and lower openings 24 and 26 are in communication with the fluidizing chamber 22, respectively, and the upper opening 24 is located right on the top end 28. The lower opening 26 is adapted for ammonia laden wastewater to be introduced into the fluidizing chamber 22 therefrom. In the present embodiment, the column is in a tubular shape and extends in a vertical direction.

The carrier particles 30 is partially filled in the fluidizing chamber 22. That is, the fluidizing chamber 22 is not entirely and compactly filled by the carrier particles 30. For example, carrier particles 30 can be, but not limited to, synthesized particles with several grooves on their surfaces, such as Bioballs™ from AQUARIUM CO., LTD, Taiwan.

The first settling tank 40 has a bottom opening 42, a first outlet 44 located at a position higher than the bottom opening 42, and a top portion 46. The first settling tank 40 is disposed on the top end 28 and atop the column 20. Thus the bottom opening 42 of the first settling tank 40 is in communication with the upper opening 24 of the column 20. The top portion 46 is formed with a gas outlet 461 for the gas yield in the column 20 to be expelled therefrom.

The second settling tank 50 has an inlet 52, a second outlet 54, a top portion 56 and a damper 58. The inlet 52 is in communication with the first outlet 44 of the first settling tank 40. The top portion 56 is formed with a gas outlet 561. The damper 58 is formed in a manner to change the flow direction of the wastewater in the second settling tank 50 and to further help settle the suspended solids in the wastewater. The first and second settling tanks 40 and 50 have a total volume of 9 liters. In other possible embodiments of the present invention, the fluidized bed reactor can be provided without the second settling tank 50 if, for example, the suspended solids can be readily settled in the first settling tank.

The aeration apparatus 60 has an aerating terminal 62 extending into the column 20 via the first settling tank 40 to maintain the dissolved oxygen concentration within the fluidizing chamber 22 at 0.1-0.5 mg/L.

The fluidized bed reactor 10 further has a fluidizing means for introducing the ammonia laden wastewater into the fluidizing chamber 22 via the lower opening 26 of the column 20, and for further fluidizing the carrier particles 30 within the fluidizing chamber 22. In an application of the present invention, the fluidizing means can enable the carrier particles 30 to suspend only in the fluidizing chamber 22 but not into the first settling tank 40. The fluidizing means includes an apparatus, such as a water pump, capable of generating an upflow in the fluidizing chamber 22. The water pump can be disposed on the upstream side or downstream side of the fluidizing chamber 22. The flow rate of the upflow generated is large enough for the carrier particles 30 to suspend. The ammonia laden wastewater introduced in the fluidizing chamber 22 further has chemical oxygen demand (COD).

The fluidized bed reactor 10 is further provided with microorganisms including nitrifying bacteria, anammox bacteria and heterotrophic denitrifying bacteria. At least a part of the microorganisms are attached to the carrier particles 30. The nitrifying bacteria is adapted to perform nitrification reaction and transform ammonia into nitrite. The anammox bacteria is adapted to perform anammox reaction, i.e. autotrophic denitrifying reaction, and transform ammonia and nitrite into nitrogen gas and nitrate. The heterotrophic denitrifying bacteria is adapted to perform heterotrophic denitrification reaction and transform nitrate and COD into nitrogen gas.

A method for treating ammonia laden wastewater is also provided, in which the above-mentioned fluidized bed reactor 10 is applied in the method. The nitrification reaction, the anammox reaction and the heterotrophic denitrification reaction are simultaneously taking place in the fluidizing chamber 22. After the ammonia laden wastewater is introduced into the fluidizing chamber 22 via the lower opening 26, the wastewater further flows through, in sequence, the upper opening 24, the bottom opening 42, the first outlet 44, the inlet 52 of the second settling tank 50, and finally the second outlet 54.

To culture the microorganisms in the fluidizing chamber 22, one can inoculate the sludge containing the above-mentioned microorganisms into the fluidizing chamber 22. During start-up, at least a part of the microorganisms can spontaneously transplant onto the carrier particles 30. In an embodiment of the present invention, the sludge is collected from a local landfill leachate wastewater treatment plant in New Taipei City and then inoculated into the fluidized bed reactor 10 at the beginning of the start-up. The operation data of the start-up of the fluidized bed reactor 10 is shown in Table 1. The sludge retention time is substantially infinity in the present embodiment.

TABLE 1

Operation data during the start-up

| Parameters | Operation Data |
| --- | --- |
| Temperature | Ambient temperature |
| Flow rate | 2 L/min |
| Sludge retention time | Infinity |
| Sludge concentration | MLSS: 4725 mg/L |
|  | MLVSS: 3510 mg/L |

During the start-up, the ammonia laden wastewater is introducing into the fluidizing chamber 26 from the lower opening 26 of the column 20. The wastewater fed to the reactor is from the secondary clarifier in a local wastewater treatment plant at Taoyuan City. The chemical parameters of the wastewater is shown in Table 2, in which "TTN" stands for "total target nitrogen" in the present specification, and TTN concentration is the sum of the concentrations of ammonia, nitrite and nitrate. It is noted that the ammonia concentration of the fed wastewater is quite low.

TABLE 2

Parameters of the wastewater

| Parameters | Conc. (mg/L) | Parameters | Conc. (mg/L) |
| --- | --- | --- | --- |
| $NH_4^+$—N | 26 ± 4 | COD | 25 ± 16 |
| $NO_2^-$—N | 0 ± 0 | TSS | 7 ± 8 |
| $NO_3^-$—N | 2 ± 1 | VSS | 4 ± 3 |
| TTN | 28 ± 5 | — | — |

Figure 2:
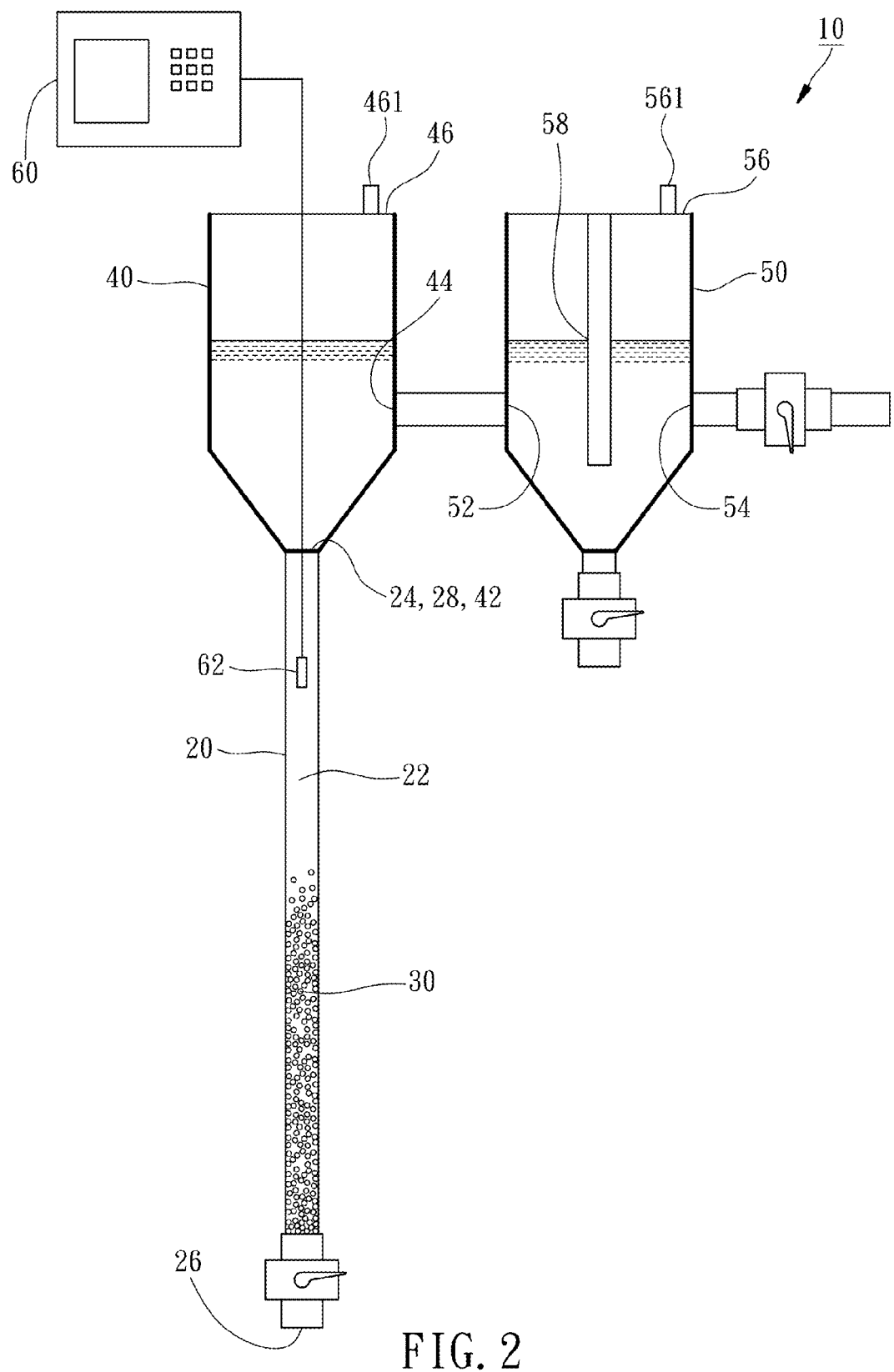
FIG. 2 is a drawing showing a fluidized bed reactor in accordance with an embodiment of the present invention after activated.

When the fluidized bed reactor 10 is activated, as shown in FIG. 2, the carrier particles 30 is caused to suspend within the fluidizing chamber 22 by the ammonia laden wastewater upflow. The microorganisms on the carrier particles 30 perform partial nitrification reaction, anammox reaction and heterotrophic denitrification reaction simultaneously in the fluidizing chamber 22. After the wastewater stream is fed into the fluidizing chamber 22 from the lower opening 26, it flows sequentially through the upper opening 24 of the column 20, the bottom opening 42 and the first outlet 44 of the first settling tank 40, then further flows through the inlet 52 and the second outlet 54 of the second settling tank 50. In addition, the hydraulic retention time, hereinafter referred to as HRT, of the wastewater within the fluidizing chamber 22 is 12-24 hours. In the present embodiment, the HRT on days 1-28 is 24 hours, while the HRT on days 29-63 is shortened to 18 hours.

Figure 3:
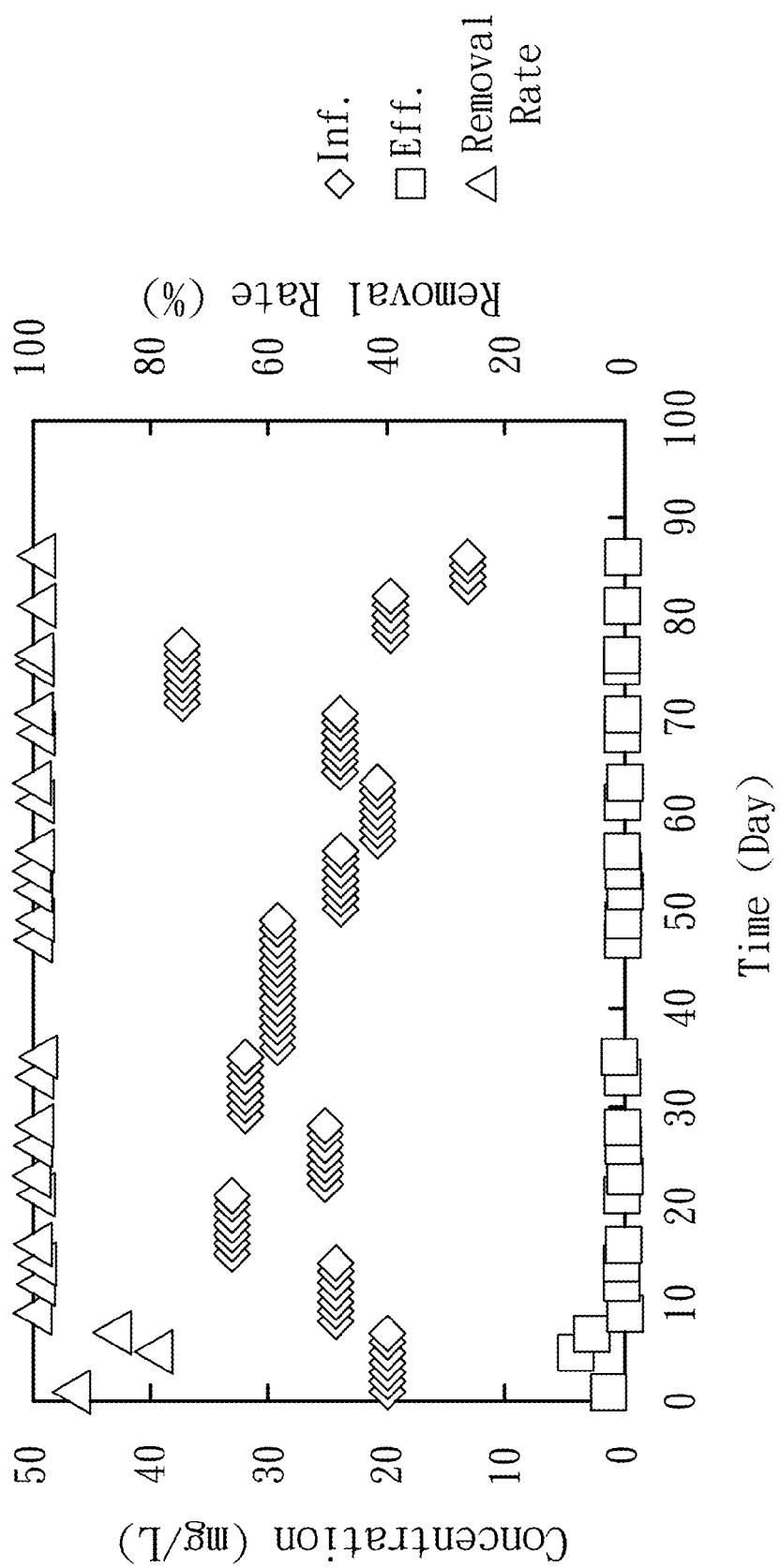
FIG. 3 is a drawing showing the relationships of ammonia concentration and ammonia removal rate to time in accordance with an embodiment of the present invention.
Figure 4:
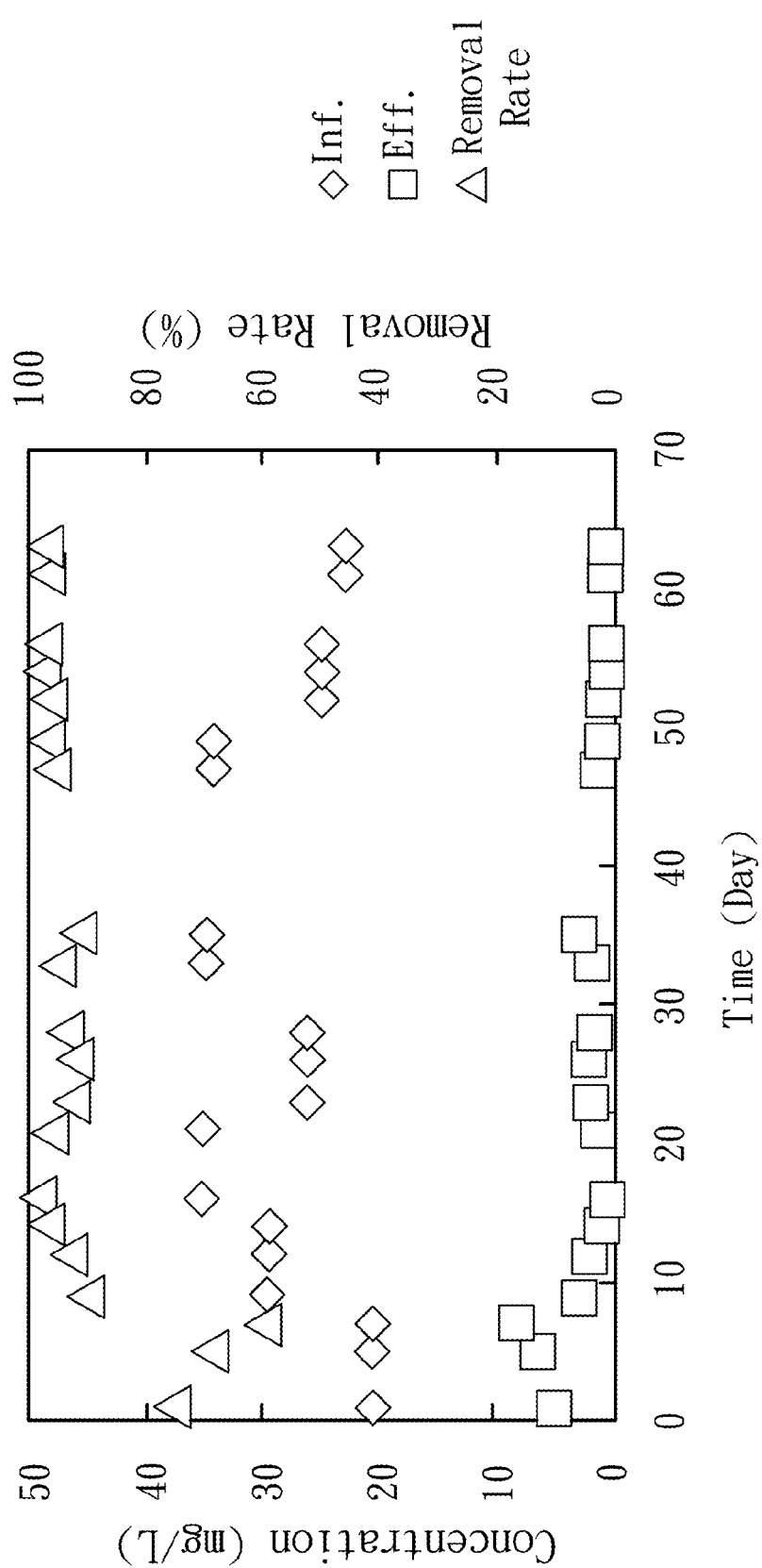
FIG. 4 is a drawing showing relationships of TTN (total target nitrogen) concentration and TTN removal rate to time in accordance with an embodiment of the present invention.

Performance of the fluidized bed reactor is shown in Table 3 and FIGS. 3-4. As a result, the average ammonia removal rate is 98.3%, and the ammonia removal rate already reaches 93.5% on the very first day of the treatment. In other words, the ammonia removal rate remains above 70% from the first day and further remains above 80% from the ninth day.

Specifically, the average ammonia removal rate for days 1-28, i.e. when the HRT is 24 hours, is 96.1%, while the average ammonia removal rate for days 29-63, i.e. when the HRT is 18 hours, further reaches up to 99.7%. On the other hand, the average TTN removal rate is 91.3%, and the TTN removal rate reaches 75.8% on the first day of the treatment. The TTN removal rate can steadily maintain above 80% from the ninth day of the treatment. The average TTN removal rate for days 1-28 when the HRT is 24 hours is 87.2%, while the same rate reaches up to 96.3% for days 29-63 when the HRT is 18 hours is 96.3%.

TABLE 3

Test result

| Parameters | HRT | |
| --- | --- | --- |
| | 18 hours | 24 hours |
| TTN | 1 ± 1 mg/L | 2 ± 0 mg/L |
| $NH_4^+$—N | 0 ± 0 mg/L | 0 ± 0 mg/L |
| $NO_2^-$—N | 0 ± 0 mg/L | 0 ± 0 mg/L |
| $NO_3^-$—N | 1 ± 1 mg/L | 2 ± 0 mg/L |
| COD | 13 ± 5 mg/L | 17 ± 3 mg/L |
| TSS | 2 ± 5 mg/L | 2 ± 1 mg/L |
| VSS | 1 ± 1 mg/L | 2 ± 1 mg/L |

The test result shows that the fluidized bed reactor 10 can be used to efficiently treat thin ammonia laden wastewater. Compared with the prior art applying other treatment methods/reactors, the start-up of the present invention is extremely shortened. An example of the prior arts is shown in applicants' prior U.S. patent application Ser. No. 14/198,111 disclosing a sequencing batch reactor, which uses synthetic wastewater with the ammonia concentration of 400-600 mg/L during the start-up. Denitrification of the synthetic wastewater is cooperatively done by the nitrifying bacteria, the anammox bacteria and the heterotrophic denitrifying bacteria. The result in the U.S. '111 application shows that it takes about 90 days of start-up for the TTN removal rate to maintain at a level above 80% and further takes about 330 for the same rate to reach nearly 100%. Daverey et al. (Achlesh Daverey, Nien-Tzu Hung, Kasturi Dutta, Jih-Gaw Lin, Chen. 2013. Ambient temperature SNAD process treating anaerobic digester liquor of swine wastewater. Bioresource Technology 141:191-198) also uses sequence batch reactor to treat swine wastewater. During the start-up, the reactor of Daverey et al. reaches a steady level of the ammonia removal rate of 80% after 60-70 days, while the same reactor takes 75 days for the TTN removal rate to reach 75% and takes 480 days for the TTN removal rate to further reach 80%. Keluskar et al. (Radhika Keluskar, Anuradha Nerurkar, Anjana Desai. 2013. Development of a simultaneous partial nitrification, anaerobic ammonia oxidation and denitrification (SNAD) bench scale process for removal of ammonia from effluent of a fertilizer industry. Bioresource Technology 130:390-397) uses cylindrical reactor to treat fertilizer industry wastewater. During the start-up of Keluskar et al., it takes 30 days for the ammonia removal rate to reach 80%.

Generally speaking, the start-up can be deemed finished when the nitrogen removal rate can steadily maintain above 80%. Under such definition, we find that the fluidized bed reactor and method of the present invention are advantageous in the fact that the start-up is extremely short compared with the conventional methods/reactors. In addition, the fluidized bed reactor of the present invention is also adapted for the treatment of thin ammonia laden wastewater, e.g. municipal wastewater containing only 20-85 mg/L ammonia. Such fact overturns the conventional recognition that anammox-based technology is not an ideal process for municipal wastewater.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A fluidized bed reactor for ammonia laden wastewater, comprising:
a column, defining a fluidizing chamber therein, the column having an upper opening and a lower opening, the upper and lower openings being in communication with the fluidizing chamber, respectively;
a plurality of carrier particles, partially filled in the fluidizing chamber;
a first settling tank, having a bottom opening and a first outlet located at a position higher than the bottom opening, the bottom opening being in communication with the upper opening of the column;
a fluidizing means for introducing the ammonia laden wastewater into the fluidizing chamber via the lower opening, and for further fluidizing the carrier particles within the fluidizing chamber, the ammonia laden wastewater so introduced further having COD; and
microorganisms, comprising nitrifying bacteria, anammox bacteria and heterotrophic denitrifying bacteria, at least a part of the microorganisms being attached to the carrier particles, the nitrifying bacteria being adapted to perform nitrification reaction and transform ammonia into nitrite, the anammox bacteria being adapted to perform anammox reaction and transform ammonia and nitrite into nitrogen gas and nitrate, the heterotrophic denitrifying bacteria being adapted to perform heterotrophic denitrification reaction and transform nitrate and COD into nitrogen gas,
wherein the first settling tank is disposed atop the column.

2. The fluidized bed reactor of claim 1, wherein a concentration of dissolved oxygen within the fluidizing chamber is 0.1-0.5 mg/L.

3. The fluidized bed reactor of claim 1, wherein the first settling tank has a top portion formed with a gas outlet.

4. The fluidized bed reactor of claim 1, further comprising a second settling tank, the second settling tank having an inlet and a second outlet, the inlet being in communication with the first outlet of the first settling tank.

5. A method for treating ammonia laden wastewater applying the fluidized bed reactor of claim 1, the nitrification reaction, the anammox reaction and the heterotrophic denitrification reaction being simultaneously taking place within the fluidizing chamber, the ammonia laden wastewater being introduced into the fluidizing chamber via the lower opening and then flowing through, in sequence, the upper opening, the bottom opening and the first outlet.

6. The method of claim 5, wherein the concentration of dissolved oxygen within the fluidizing chamber is 0.1-0.5 mg/L.

7. The method of claim 5, wherein the first settling tank has a top portion formed with a gas outlet.

8. The method of claim 5, wherein the fluidized bed reactor further comprises a second settling tank, the second settling tank has an inlet and a second outlet, the inlet is in communication with the first outlet and the first settling tank, the ammonia laden wastewater further flows through, in sequence, the inlet and the second outlet after flowing through the first outlet.

9. The method of claim 5, wherein a hydraulic retention time of the ammonia laden wastewater in the fluidizing chamber is 12-24 hours.

10. The method of claim 6, wherein a concentration of the ammonia in the ammonia laden wastewater is 20-85 mg/L.

* * * * *